(12) United States Patent
Kilroy et al.

(10) Patent No.: US 8,423,558 B2
(45) Date of Patent: Apr. 16, 2013

(54) TARGETING ONLINE ADS BY GROUPING AND MAPPING USER PROPERTIES

(75) Inventors: Jonathan Kilroy, Champaign, IL (US); Dale Nussel, Mahomet, IL (US); Allie K. Watfa, Urbana, IL (US)

(73) Assignee: Yahoo! Inc., Sunnyvale, CA (US)

( * ) Notice: Subject to any disclaimer, the term of this patent is extended or adjusted under 35 U.S.C. 154(b) by 521 days.

(21) Appl. No.: 12/701,049

(22) Filed: Feb. 5, 2010

(65) Prior Publication Data

US 2011/0196871 A1 Aug. 11, 2011

(51) Int. Cl.
*G06F 17/30* (2006.01)
(52) U.S. Cl.
USPC ...................................... 707/749; 705/14.49
(58) Field of Classification Search .................. 707/737, 707/749; 705/14.49
See application file for complete search history.

(56) References Cited

U.S. PATENT DOCUMENTS

| 7,813,954 | B1* | 10/2010 | Price et al. ................. 705/14.1 |
| 2001/0037467 | A1* | 11/2001 | O'Toole et al. ............. 713/201 |
| 2002/0077966 | A1* | 6/2002 | Harycki et al. .............. 705/38 |
| 2006/0068919 | A1* | 3/2006 | Gottfurcht .................... 463/42 |

* cited by examiner

*Primary Examiner* — James Trujillo
*Assistant Examiner* — William Spieler
(74) *Attorney, Agent, or Firm* — Stattler-Suh PC (57) ABSTRACT

A method and a system are provided for targeting online ads by grouping and mapping user properties. In one example, the system receives user data associated with one or more users. The system identifies user properties for a user. The system eliminates unacceptable user properties associated with the user. The system identifies permutations of the user properties associated with the user. The system eliminates unacceptable permutations of the user properties associated with the user. Valid permutations remain. The system attaches a weight of importance to each valid permutation. A weight quantifies a level of importance of a valid permutation for the user with respect to buckets. A bucket is an ad category. The system grades each valid permutation relative to a bucket. The system calculates a final grade for each bucket. The system then assigns the user to zero or more buckets based on the final grade for each bucket.

19 Claims, 8 Drawing Sheets

TARGETING ONLINE ADS BY GROUPING AND MAPPING USER PROPERTIES

FIELD OF THE INVENTION

The invention relates to online advertising. More particularly, the invention relates to targeting online ads by grouping and mapping user properties.

BACKGROUND

An advertiser, such as Ford™ or McDonald's™, generally contracts a creative agency for ads to be placed in various media for the advertiser's products. Such media may include TV, radio, Internet ads (e.g., sponsored search ads, banner display ads, textual ads, streaming ads, mobile phone ads, etc.) or print media ads (e.g., ads in newspapers, magazines, posters, etc.). It is quite possible that the advertiser may engage one or more creative agencies that specialize in creating ads for one or more of the above media. A company wants to show the most relevant ads to end users in order to get the most value from their ad campaign.

A company like Yahoo!™ gathers enormous amounts of user data related to IP (Internet Protocol) addresses of end user computers. For example, the company may gather valuable search data when end users perform search queries. The search data may include search terms, searches performed and other data. The company may get information about a user by collecting user profile information that the user inputs into a web site. The company may also infer demographic information (e.g., location, age, gender, etc.) from analyzing the pages an end user visits, even if the end user never does a search. The company may also gather event data, including data related to end user behavior on the Internet. Such behavior may include, for example, clicks on ads. The company sees IP addresses from which the company can usually infer zip codes and even street-level data. The company sees login information and sees the pages that end users visit. All of this data is highly valuable to any company that advertises because the data may help the company advertise in the most effective way.

The search advertising marketplace generates billions of dollars in revenue each year for search engine companies like Yahoo!™. The search marketing marketplace works on a cost-per-click (CPC) model. When an end user performs a search query online and clicks on a sponsored search text ad, a company like Yahoo!™ is paid by the respective advertiser. End users tend to click on more relevant ads.

An advertiser that utilizes data from a search engine wants to show the most relevant ads to end users in order to get more clicks on the advertiser's ads. In order to do this, the advertiser needs to gather end users' events, such as user profiles, search terms, searches performed, search behavior, click behavior and other browsing behavior. The advertiser may then use this information to target relevant ads to different end users.

In the CPC model, there are two important events that go through a data pipeline—search events and click events. Search events occur when an end user performs a search query. Click events occur when an end user clicks on a sponsored text ad. Web servers of a company like Yahoo!™ collect search events when an end user performs a query on the company's search page. URLs of the ads on the search result web page may contain the click event information. An advertiser may want to collect and analyze the search and click events in order to build a model for query-to-text ad relevance. If the advertiser can learn which ads are more relevant, then the advertiser can target these ads to end users and get a higher click-through rate (CTR).

The amount of data gather by a search engine company, such as Yahoo!™, is tremendous. The amount of data is typically in the order of petabytes per day. There is so much data that, unfortunately, not all the data is utilized in an efficient manner.

SUMMARY

What is needed is an improved method having features for addressing the problems mentioned above and new features not yet discussed. Broadly speaking, the invention fills these needs by providing a method and a system for targeting online ads by grouping and mapping user properties.

In a first embodiment, a computer-implemented method is provided for targeting items (e.g., ads). The method comprises at least the following: receiving, at a computer, user data associated with one or more users; identifying, at a computer, user properties for a first user, wherein the user properties for the first user are obtained from profile data about the first user, and wherein the profile data about the first user is obtained from the user data; eliminating, at a computer, unacceptable user properties associated with the first user; identifying, at a computer, permutations of the user properties associated with the first user, wherein a permutation is an organized group of user properties; eliminating, at a computer, unacceptable permutations of the user properties associated with the first user, wherein valid permutations remain; and attaching, at a computer, a weight of importance to each valid permutation, wherein a weight quantifies a level of importance of a valid permutation for the first user with respect to buckets being analyzed, wherein a bucket is an item category.

In a second embodiment, a system is provided for targeting items (e.g., ads). The system comprises at least a computer system configured for at least the following: receiving user data associated with one or more users; identifying user properties for a first user, wherein the user properties for the first user are obtained from profile data about the first user, and wherein the profile data about the first user is obtained from the user data; eliminating unacceptable user properties associated with the first user; identifying permutations of the user properties associated with the first user, wherein a permutation is an organized group of user properties; eliminating unacceptable permutations of the user properties associated with the first user, wherein valid permutations remain; and attaching a weight of importance to each valid permutation, wherein a weight quantifies a level of importance of a valid permutation for the first user with respect to buckets being analyzed, wherein a bucket is an item category.

In a third embodiment, a computer readable medium is provided comprising one or more instructions for targeting items (e.g., ads). The one or more instructions are configured for causing one or more processors to perform at least the following steps: receiving user data associated with one or more users; identifying user properties for a first user, wherein the user properties for the first user are obtained from profile data about the first user, and wherein the profile data about the first user is obtained from the user data; eliminating unacceptable user properties associated with the first user; identifying permutations of the user properties associated with the first user, wherein a permutation is an organized group of user properties; eliminating unacceptable permutations of the user properties associated with the first user, wherein valid permutations remain; and attaching a weight of importance to each valid permutation, wherein a weight quantifies a level of importance of a valid permutation for the first user with respect to buckets being analyzed, wherein a bucket is an item category.

The invention encompasses other embodiments configured as set forth above and with other features and alternatives. It should be appreciated that the invention can be implemented in numerous ways, including as a method, a process, an apparatus, a system or a device.

BRIEF DESCRIPTION OF THE DRAWINGS

The invention will be readily understood by the following detailed description in conjunction with the accompanying drawings. To facilitate this description, like reference numerals designate like structural elements.

DETAILED DESCRIPTION

An invention is disclosed for a method and a system for targeting online ads by grouping and mapping user properties. Numerous specific details are set forth in order to provide a thorough understanding of the invention. It will be understood, however, to one skilled in the art, that the invention may be practiced with other specific details.

DEFINITIONS

Some terms are defined below in alphabetical order for easy reference. These terms are not rigidly restricted to these definitions. A term may be further defined by its use in other sections of this description.

"Ad" (e.g., advertisement, item and/or message) means a paid announcement, as of goods or services for sale, preferably on a network, such as the Internet. An ad may also be referred to as an advertisement, an item and/or a message.

"Ad Server" is a server that is configured for serving one or more ads to user devices. An ad server is preferably controlled by a publisher of a web site and/or an advertiser of online ads. A server is defined below.

"Advertiser" (e.g., messenger and/or messaging customer, etc.) means an entity that is in the business of marketing a product and/or a service to users. An advertiser may include without limitation a seller and/or a third-party agent for the seller.

"Application server" is a server that is configured for running one or more devices loaded on the application server. For example, an application server may run a device configured for targeting online ads.

"Bucket" means a relatively broad ad category.

"Client" means the client part of a client-server architecture. A client is typically a user device and/or an application that runs on a user device. A client typically relies on a server to perform some operations. For example, an email client is an application that enables a user to send and receive e-mail via an email server. The computer running such an email client may also be referred to as a client.

"Data warehouse" means a repository of an organization's electronically stored data. Data warehouses are designed to facilitate reporting and analysis. A data warehouse houses a standardized, consistent, clean and integrated form of data sourced from various operational systems in use in the organization, structured in a way to specifically address the reporting and analytic requirements.

"Database" (e.g., database system, etc.) means a collection of data organized in such a way that a computer program may quickly select desired pieces of the data. A database is an electronic filing system. In some instances, the term "database" is used as shorthand for "database management system".

"Device" means hardware, software or a combination thereof. A device may sometimes be referred to as an apparatus. Examples of a device include without limitation a software application such as Microsoft Word™, a laptop computer, a database, a server, a display, a computer mouse and/or a hard disk.

"Marketplace" means a world of commercial activity where products and/or services are browsed, bought and/or sold, etc. A marketplace may be located over a network, such as the Internet. A marketplace may also be located in a physical environment, such as a shopping mall.

"Network" means a connection, between any two or more computers, that permits the transmission of data. A network may be any combination of networks, including without limitation the Internet, a local area network, a wide area network, a wireless network and a cellular network.

"Publisher" means an entity that publishes, on a network, a web page having content and/or ads, etc.

"Server" means a software application that provides services to other computer programs (and their users), in the same computer or other computer. A server may also refer to the physical computer that has been set aside to run a specific server application. For example, when the software Apache HTTP Server is used as the web server for a company's web site, the computer running Apache may also be called the web server. Server applications may be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User" (e.g., consumer, etc.) means an operator of a user device. A user is typically a person who seeks to acquire a product and/or service. For example, a user may be a woman who is browsing Yahoo!™ Shopping for a new cell phone to replace her current cell phone. The term "user" may refer to a user device, depending on the context.

"User device" (e.g., computer, user computer, client and/or server, etc.) means a single computer or to a network of interacting computers. A user device is a computer that a user may use to communicate with other devices over a network, such as the Internet. A user device is a combination of a hardware system, a software operating system and perhaps one or more software application programs. Examples of a user device include without limitation a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" means a software program which can display text, graphics, or both, from web pages on web sites. Examples of a web browser include without limitation Mozilla Firefox™ and Microsoft Internet Explorer™.

"Web page" means documents written in a mark-up language including without limitation HTML (hypertext mark-up language), VRML (virtual reality modeling language), dynamic HTML, XML (extended mark-up language) and/or other related computer languages. A web page may also refer to a collection of such documents reachable through one specific Internet address and/or through one specific web site. A web page may also refer to any document obtainable through a particular URL (Uniform Resource Locator).

"Web server" is a server configured for serving at least one web page to a web browser. An example of a web server is a Yahoo!™ web server. A server is defined above.

"Web site" means one or more web pages. A web site preferably includes plurality of web pages, virtually connected to form a coherent group.

General Overview

The system provides a way to access and track user interest for better user interest capturing and, thus, better ad targeting per user. The system is configured for having a map of user properties that can be automatically identified. The system is configured for then targeting users based on the map. Such interest calculations are performed faster depending on how well the user map matches others with similar maps (e.g., social matching, etc.). The system may also provide the user, analyst, advertiser and/or publisher, etc., with the tools to check other users' activities that may match a particular user's map characteristics.

The ad targeting performed by the system involves operations that are feasible by an entity that has access to massive amounts of user data. The ad targeting is substantially infeasible, or is substantially imprecise, without access to a computer system that is configured for receiving a massive amount of user data (e.g., user profile data, search data, browsing behavior, etc.) at multiple locations across the Internet or other network. A company like Yahoo!™ or Amazon.com™ has such capabilities because of the enormous amount of user data collected via the company's website portal. The company gathers enormous amounts of user profile data. For example, the company my gather data from users who establish accounts, login to the company's website portal and input user information (e.g., location, age, gender, etc.). The company may also infer demographic information (e.g., location, age, gender, etc.) from analyzing the pages a user visits, even if the user never does a search.

The company may also gather enormous amounts of data related to IP (Internet Protocol) addresses of user devices. For example, the company may gather valuable search data when users perform search queries. The search data may include search terms, searches performed and other data. The company may also gather event data, including data related to user behavior on the Internet. Such behavior may include, for example, clicks on ads. The company sees IP addresses from which the company can usually infer zip codes and even street-level data. The company sees login information and sees the pages that users visit. All of this user data (e.g., user profile data and/or behavioral data, etc.) is highly valuable to any company that advertises. This user data helps the company to advertise in a more effective way.

Accordingly, the system preferably uses user profile data to perform ad targeting operations. The system combines results of the ad targeting operations with other factors (e.g., behavioral data, etc.) in order to set base reserve prices for ads.

Figure 1:
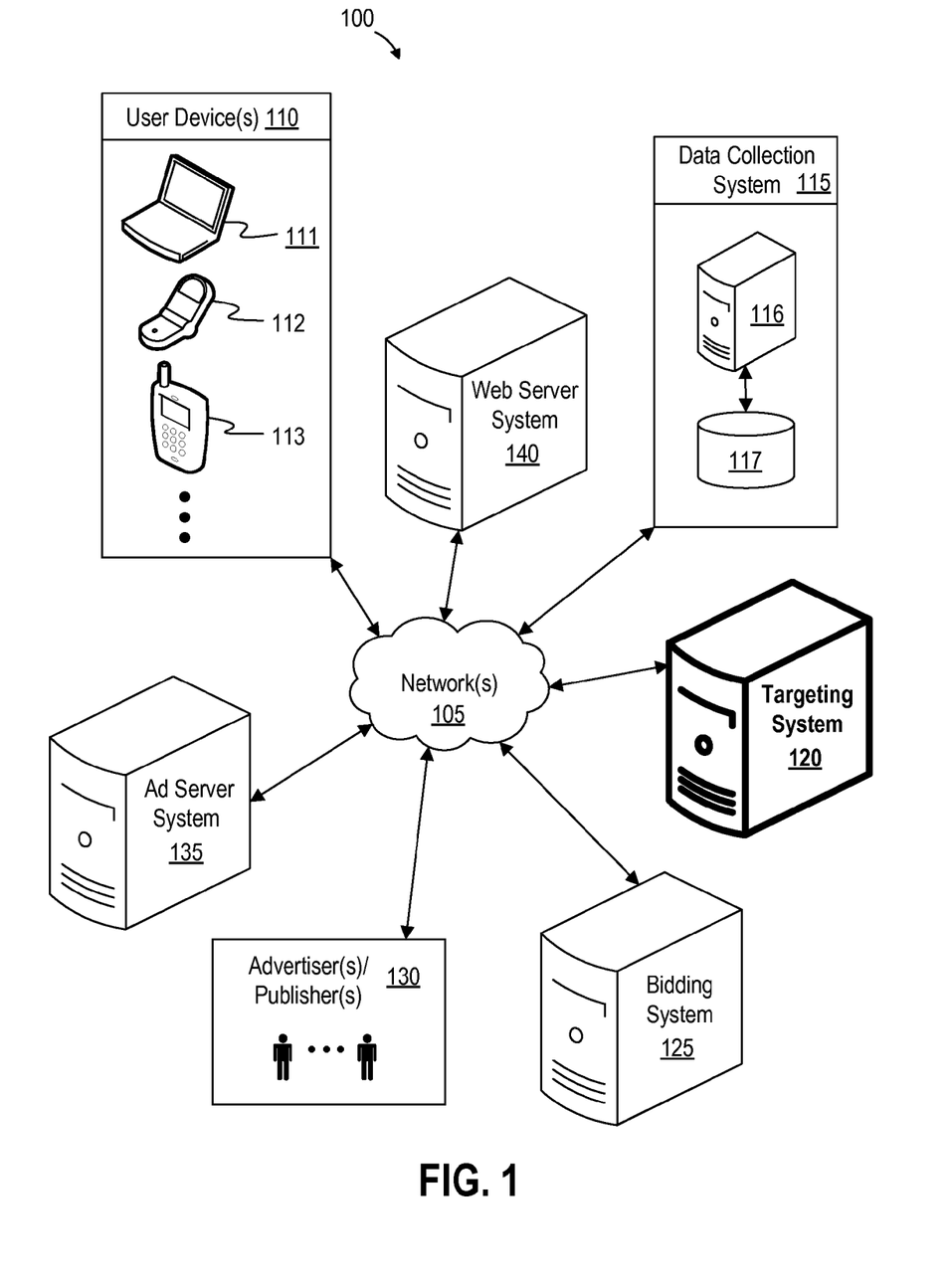
FIG. 1 is a high-level block diagram of a system for targeting ads, in accordance with some embodiments.

FIG. 1 is a high-level block diagram of a system 100 for targeting ads, in accordance with some embodiments. The one or more networks 105 couple together one or more user devices 110, a data collection system 115, a targeting system 120, a bidding system 125, one or more advertiser(s)/publisher(s) 130, an ad server system 135 and a web server system 140. The network 105 may be any combination of networks, including without limitation the Internet, a local area network, a wide area network, a wireless network and/or a cellular network.

Each user device 110 includes without limitation a single computer or a network of interacting computers. Examples of a user device include without limitation a laptop computer 111, a cell phone 112 and a smart phone 113. A user may communicate with other devices over the network 105 by using a user device 110. A user may be, for example, a person browsing or shopping in a marketplace on the Internet.

The web server system 140 may include without limitation web servers, application servers, search engines and/or databases. The web server system 140 is configured for communicating with the user devices 110 and serving at least one web page to a web browser on a user device 110. The web server system 140 is configured for providing online services, including without limitation searching, browsing and/or shopping operations.

The data collection system 115 includes without limitation one or more servers 116 and one or more data warehouses 117 for collecting data. The one or more databases may alternatively be one or more databases. The data collection system 115 is preferably an expansive conglomeration of servers strategically positioned at multiple locations across the network 105. The data collection system 115 is configured for collecting enormous amounts of user data from user devices 110. The one or more data warehouses 117 are configured for storing data (e.g., historical data, etc.) that may be used for performing targeting operations, as discussed below with reference to FIG. 2 through FIG. 7. A company like Yahoo!™ typically operates, or at least has access, to a data collection system 115.

The targeting system 120 includes without limitation one or more devices for processing data (e.g., historical data, real time data, etc.) received from the data collection system 115 and/or from other sources. For example, the targeting system 120 may include one or more application servers configured for performing targeting operations based on data received from data collection system 115 and/or other sources.

The bidding system 125 includes without limitation one or more devices for processing data received from the data collection system 115, the targeting system 120 and/or other sources. For example, the targeting system 125 may include one or more application servers configured for setting ad pricing based on data received from data collection system 115, the targeting system 120 and/or other sources. The bidding system 125 is configured for sending ad pricing information to one or more advertiser(s)/publisher(s) 130.

The ad server system 135 may include without limitation ad servers, application servers and/or databases. The ad server system 135 is configured for serving one or more ads to the user devices 110. An ad server system 135 is preferably controlled by a publisher 130 of a web site and/or an advertiser 130 of online ads. A publisher 130 is an entity that publishes, over the network 105, a web page having content and/or ads. An advertiser 130 is an entity that is seeking to market a product and/or a service to users at the user devices 110. Examples of a publisher/advertiser 130 include without limitation Yahoo!™, Amazon.com™ and Nike™.

The configuration of the system 100 in FIG. 1 is for explanatory purposes. There are numerous other configurations in other embodiments that are possible. For example, the targeting system 120 and the bidding system 125 may be aggregated into one computing system. As still another example, the system 100 may also include one or more databases configured for storing data generated by the targeting system 120 and/or the bidding system 125. There are many other configurations for the system 100 that are feasible as well.

Targeting Ads by Grouping and Mapping User Properties

Figure 2:
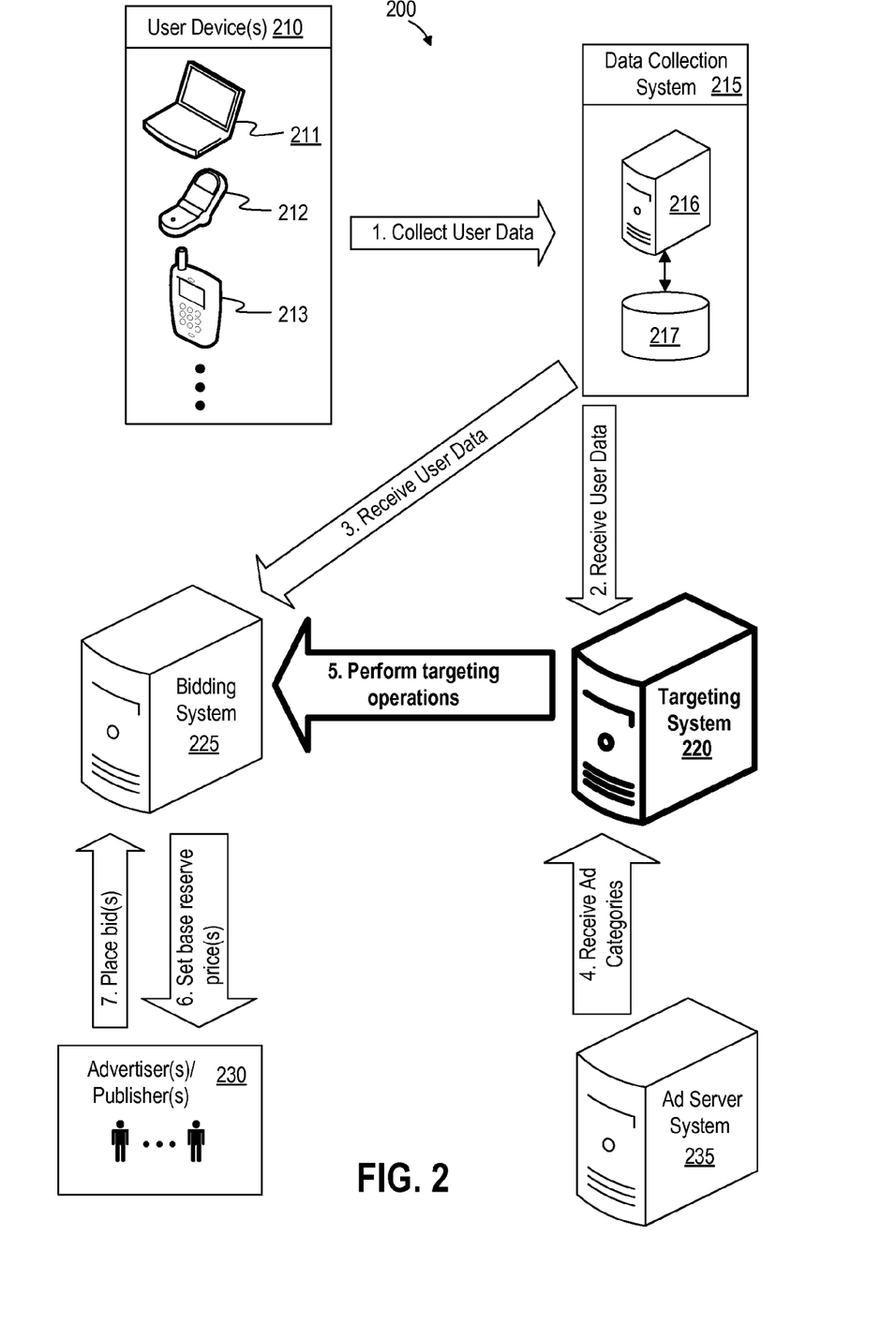
FIG. 2 is a schematic diagram of system for targeting online ads by grouping and/or mapping user properties, in accordance with some embodiments.

FIG. 2 is a schematic diagram of system 200 for targeting online ads by grouping and/or mapping user properties, in accordance with some embodiments. The system 200 may be configured in a manner similar to the system 100 of FIG. 1, and further configured as described with respect to FIG. 2. The data collection system 215 is configured for collecting user data from one or more user devices 210. The targeting system 220 and the bidding system 225 are each configured for receiving user data from the data collection system 215.

The targeting system 220 is further configured for the following without limitation: receiving ad categories (e.g., buckets) from the ad server system 235; targeting online ads by grouping and/or mapping user properties (e.g., profile data, browsing data, etc.) received from the data collection system 215; and sending results of targeting operations to the bidding system 225. The targeting operations are discussed further below with reference to FIG. 3 through FIG. 7.

The bidding system 225 is further configured for the following without limitation: combining the user data with the results of the targeting operations; setting one or more base reserve prices for one or more ads based on at least the results of the targeting operations; and receiving one or more bids from one or more advertiser(s)/publisher(s) 230. The system 100 is configured for storing in a database the targeting operations results, base reserve prices, bids and/or other data.

A company like Yahoo!™ may have billions of users in hundreds of countries. Each user may be associated with a user profile. A user in Scotland may have interests that similar to interests of a user in India. For example, they may not like the same food, may not share the same hobbies, and may not be of the same age group. However, a combination of a set of their properties may reveal that maps of these two users match well. These two users may share at least one substantially similar interest. Accordingly, the system 200 is configured for matching these two users as falling in a common bucket. A bucket is a relatively broad ad category. The system 200 is also configured for showing these two users one or more ads that are substantially similar because of the common bucket. This system is preferably not based on a 1-to-1 matching process, which likely would not reveal similarities between the two users. The system 200 is configured for assigning users to buckets based on grouping and mapping operations.

There is an increasing number of users for companies like Yahoo!™ in both the stationary online environment and the mobile environment. The user data for all the customers are getting increasingly big and unmanageable, especially if the company needs to use the user data to target the audience with personalized ads. Accordingly, the system 200 provides more efficient technique for ad matching. The ad matching is based on grouping and mapping the user profile. This technique groups/maps properties and preferences with minimum processing time. The system may then use the user mapping to match the user with ads and/or to match the user to other users having similar maps. Appropriate ads may be identified and targeted for specific audiences with relatively little processing effort.

Consider, for example, two users—User A and User B. The profile for User A includes the following information: Age is 30; Country of Residence is United States; Hobby is soccer; Marital Status is married; Favorite Food is Indian; and Partner Country is India. The profile for User B includes the following information: Age 20; Country of Residence is India; Hobby is Hollywood movies; Marital Status is single; and Favorite Food is local foods.

At first glance, there are little or no similarities between User A and User B. However, after using the targeting operations described below with reference to FIG. 3 through FIG. 7, the two users may be assigned to at least one common bucket. It would be beneficial for an advertiser to have at least one substantially similar ad shown to both User A and User B.

Figure 3:
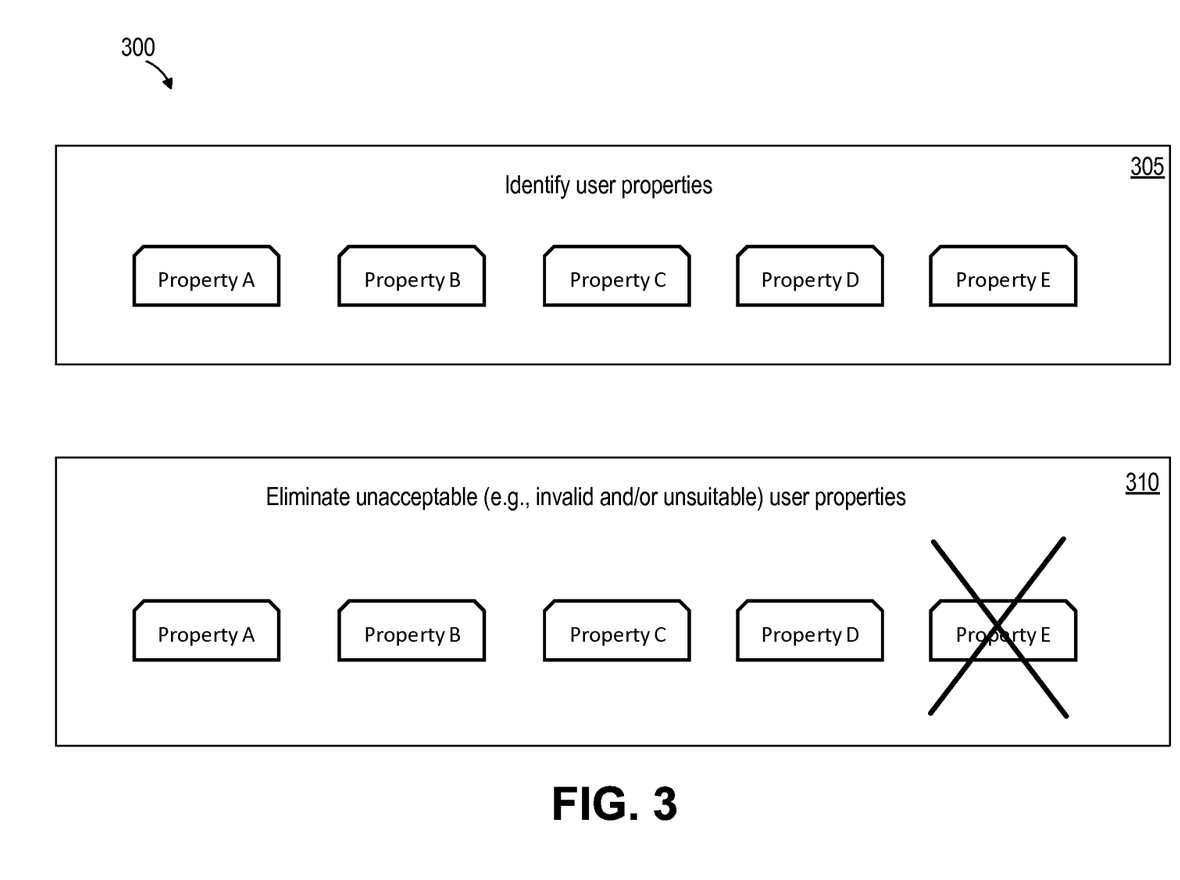
FIG. 3 is a schematic diagram of a system for identifying user properties and eliminating invalid/unsuitable user properties, in accordance with some embodiments.

FIG. 3 is a schematic diagram of a system 300 for identifying user properties and eliminating invalid/unsuitable user properties, in accordance with some embodiments. A property is a characteristic of a user. Examples of a property include without limitation the following: marital status, favorite food, country of residence, age and/or gender. For instance, Property A may be marital status; Property B may be favorite food; Property C may be country of residence, Property D may be age; and Property E may be gender. Other examples exist as well.

The system 300 is configured for identifying user properties in operation 305. For explanatory purposes, the system 300 identifies the following properties for any user: A, B, C, D and E. In some embodiments, the system 300 is configured for identifying properties by using ad categories received from an ad server system. The system 300 may associate user profile data (obtained from user data) with appropriate ad categories to obtain/identify the user properties. Such an ad server system may be configured similar to the ad server system 235 of FIG. 2. The system 300 may be configured for identifying more or fewer properties than the five identified properties shown in FIG. 3.

The system 300 is configured for eliminating unacceptable (e.g., invalid and/or unsuitable) properties in operation 310. For explanatory purposes, system 300 eliminates Property E. The valid properties are Property A, Property B, Property C and Property D. The system 300 may be configured for determining a property is unacceptable (e.g., invalid and/or unsuitable) for a number of reasons. For example, the system 300 may eliminate a property that has insufficient relevance to the buckets under analysis. The buckets under analysis may be, for example, specific countries (e.g., U.S. Market, China market, etc.). Property E may be, for example, eye color. In such a case, the system 300 may determine that eye color has insufficient relevance to the buckets (e.g., specific countries). Accordingly, the system 300 eliminates Property E (e.g., eye color) as being unacceptable (e.g., invalid and/or unsuitable) in this instance. Other examples of unacceptable (e.g., invalid and/or unsuitable) properties may include without limitation the following: proprietary data, private data, criminal evidence and/or adult-rated material. The system 300 may be configured for eliminating more or fewer properties than the one eliminated property shown in FIG. 3.

Figure 4:
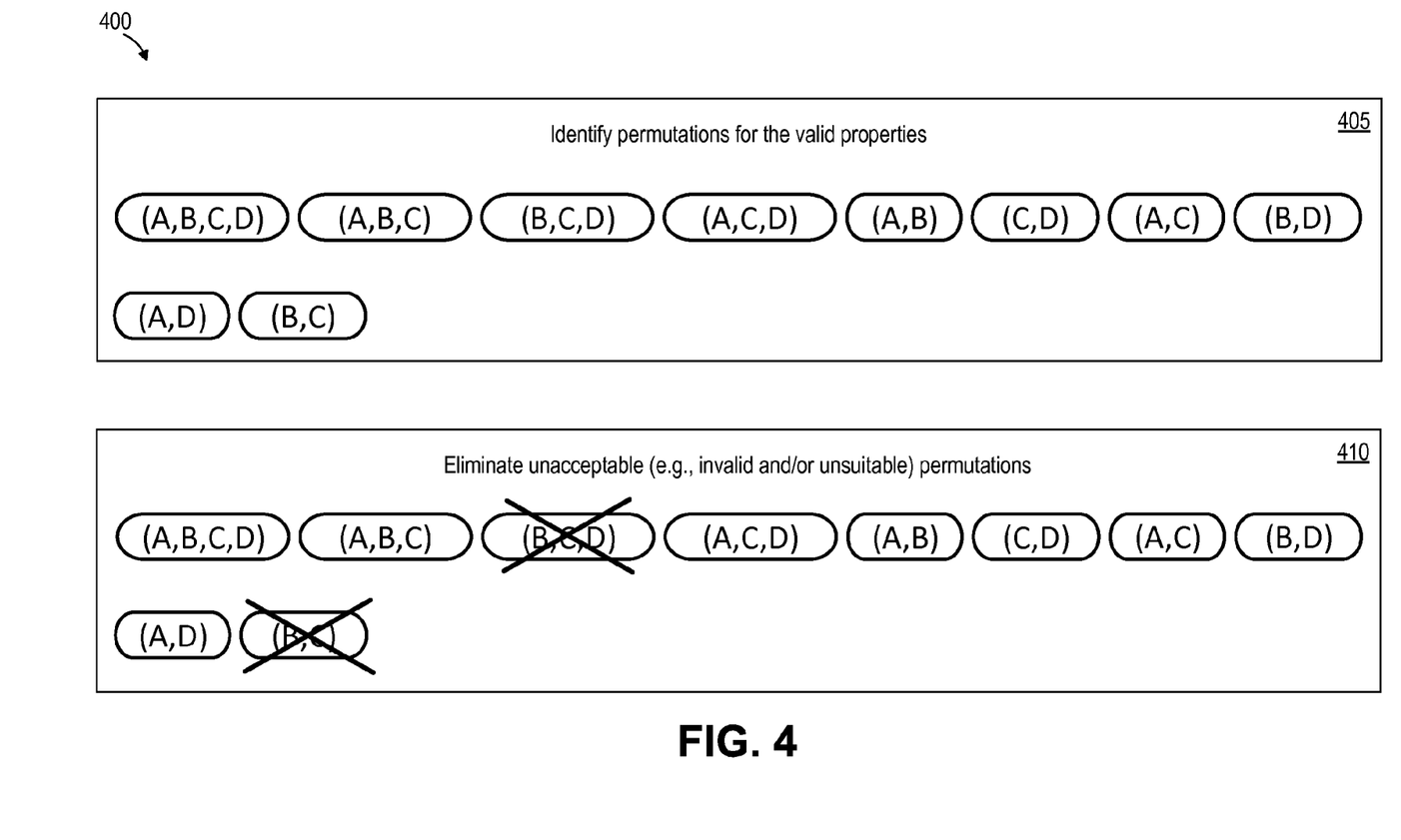
FIG. 4 is a schematic diagram of a system for identifying permutations for the valid properties and eliminating invalid/unsuitable permutations, in accordance with some embodiments.

FIG. 4 is a schematic diagram of a system 400 for identifying permutations for the valid properties and eliminating invalid/unsuitable permutations, in accordance with some embodiments. The system 400 is configured for providing further processing for the valid properties. For explanatory purposes, the valid properties are Property A, Property B, Property C and Property D.

The system 400 is configured for identifying permutations for the valid properties in operation 405. A permutation is an organized group of properties. For explanatory purposes, the system 400 identifies the following permutations: Permutation (A,B,C,D), Permutation (A,B,C), Permutation (B,C,D), Permutation (A,C,D), Permutation (A,B), Permutation (C,D), Permutation (A,C), Permutation (B,D), Permutation (A,D) and Permutation (B,C). The system 400 may be configured for identifying more or fewer permutations than the ten identified permutations shown in FIG. 4.

The system 400 is configured for eliminating unacceptable (e.g., invalid and/or unsuitable) permutations in operation 410. For explanatory purposes, the system 400 eliminates Permutation (B,C,D) and Permutation (B,C). The valid permutations are Permutation (A,B,C,D), Permutation (A,B,C), Permutation (A,C,D), Permutation (A,B), Permutation (C,D), Permutation (A,C), Permutation (B,D) and Permutation (A,D). The system 400 may be configured for determining a permutation is unacceptable (e.g., invalid and/or unsuitable) for a number of different reasons. For example, the system 400 may eliminate a permutation if the combination of properties in the permutation has insufficient relevance to the buckets under analysis. The buckets under analysis may be, for example, specific countries (e.g., U.S. Market, China market, etc.). Permutation (B,D) may be, for example, height and favorite food. In such a case, the system 400 may determine that the Permutation (B,D) has insufficient relevance to the buckets (e.g., specific countries). Accordingly, the system 400 eliminates Permutation (B,D) as being unacceptable (e.g., invalid and/or unsuitable) in this instance. Another example of an unacceptable (e.g., invalid and/or unsuitable) permutation may include without limitation the following: any permutation that has a country IP (Internet Protocol) address in the permutation. The system 400 may be configured for eliminating more or fewer permutations than the two eliminated permutations shown in FIG. 4.

Figure 5:
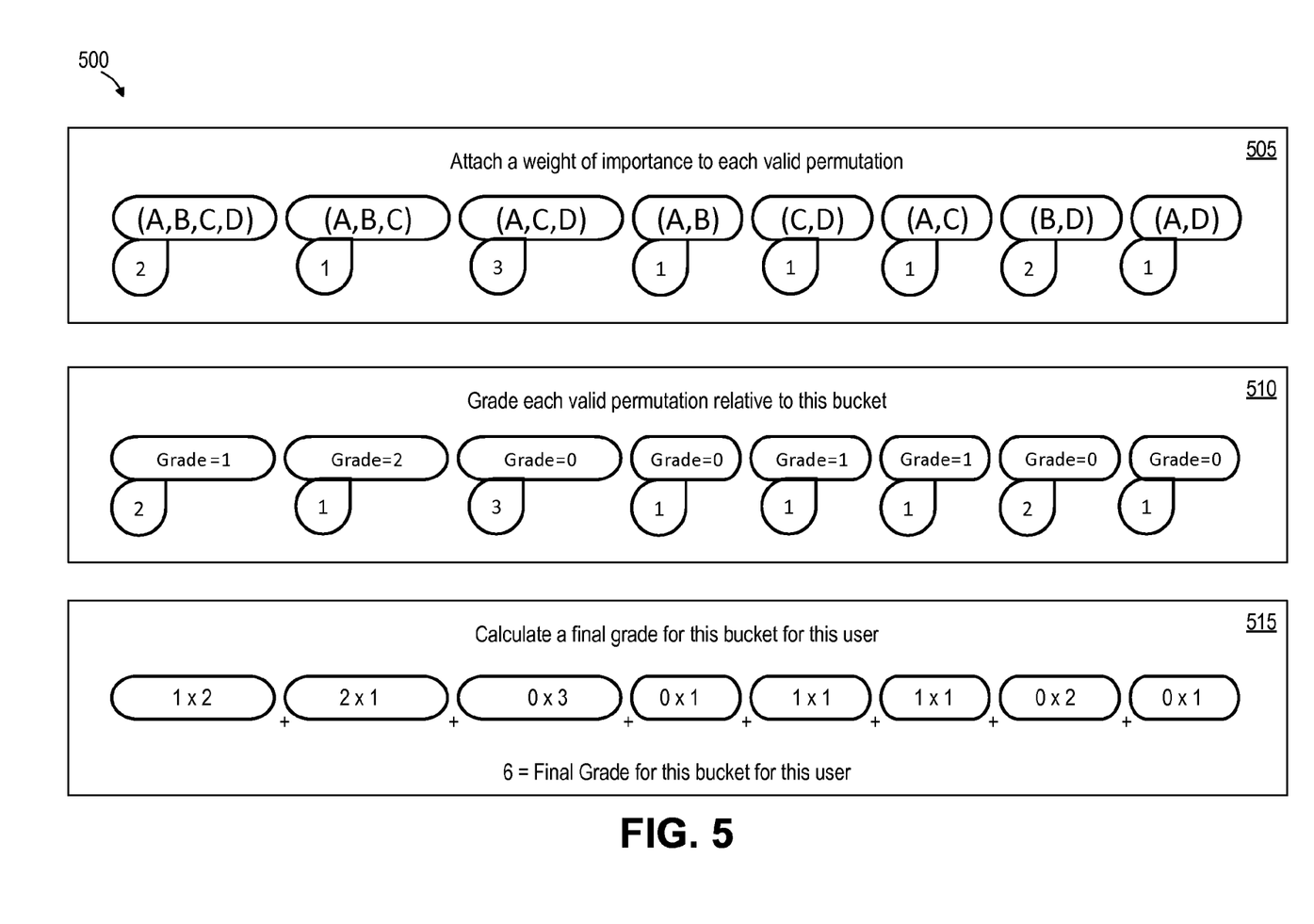
FIG. 5 is a schematic diagram of a system for weighting permutations, grading permutations and calculating a final grade for a bucket, in accordance with some embodiments.

FIG. 5 is a schematic diagram of a system 500 for weighting permutations, grading permutations and calculating a final grade for a bucket, in accordance with some embodiments. The system 500 is configured for providing further processing for the valid permutations. For explanatory purposes, the valid permutations are Permutation (A,B,C,D), Permutation (A,B,C), Permutation (A,C,D), Permutation (A,B), Permutation (C,D), Permutation (A,C), Permutation (B,D) and Permutation (A,D).

The system 500 is configured for attaching a weight of importance to each valid permutation in operation 505. A weight quantifies the level of importance of a permutation for a particular user with respect to the buckets being analyzed. For example, the system may determine that Permutation (A,B,C,D) receives a higher weight than Permutation (A,B,C). Data in the user's profile may indicate that Permutation (A,B,C,D) is more important to that user than is Permutation (A,B,C).

The system attaches a weight of 2 to Permutation (A,B,C,D). The system attaches a weight of 1 to Permutation (A,B,C). The system attaches a weight of 3 to Permutation (A,C,D). The system attaches a weight of 1 to Permutation (A,B). The system attaches a weight of 1 to Permutation (C,D). The system attaches a weight of 1 to Permutation (A,C). The system attaches a weight of 2 to Permutation (B,D). The system attaches a weight of 1 to Permutation (A,D). These weights are provided for explanatory purposes and other weights may be acceptable as well.

The system 500 is configured for calculating a grade for each permutation relative to the particular bucket being analyzed in operation 510. A grade quantifies the level of relevance of a permutation with respect to the buckets being analyzed. For example, the system may attach a high relative grade to a permutation of "favorite city and favorite food" with respect to buckets that are specific countries. Meanwhile, the system may attach a low relative grade to a permutation of "favorite toothpaste and favorite color" with respect to buckets that are specific countries.

The system calculates a grade of 1 for Permutation (A,B,C,D). The system calculates a grade of 2 for Permutation (A,B,C). The system calculates a grade of 0 for Permutation (A,C,D). The system calculates a grade of 0 for Permutation (A,B). The system calculates a grade of 1 for Permutation (C,D). The system calculates a grade of 1 for Permutation (A,C). The system calculates a grade of 0 for Permutation (B,D). The system calculates a grade of 0 for Permutation (A,D). These grades are provided for explanatory purposes and other grades may be acceptable as well.

The system 500 is configured for calculating a final grade for the present bucket for the particular user in operation 515. The final grade provides a quantitative measure of the suitability of a particular bucket for a particular user. In this example, the final grade for a bucket represents the sum of the products of the grades and weights. Other equations for the final grade may be acceptable as well. For this particular bucket for this particular user in FIG. 5, the system 500 calculates a final grade of 6. This final grade 6=(grade 1×weight 2)+(grade 2×weight 1)+(grade 0×weight 3)+(grade 0×weight 1)+(grade 1×weight 1)+(grade 1×weight 1)+(grade 0×weight 2)+(grade 0×weight 1). This final grade is provided for explanatory purposes and another grade may be acceptable as well.

The system 500 is configured for calculating a final grade for each bucket in consideration for a particular user. The system 500 is then configured for calculating final grades for multiple users. The system 500 is configured for calculating the final grade for any user who has a sufficient amount of user data with respect to the buckets in consideration.

The operations described with reference to FIG. 3 through FIG. 5 may be based on fuzzy logic techniques. Fuzzy logic is a form of multi-valued logic derived from fuzzy set theory to deal with reasoning that is approximate rather than precise. The system may be configured for receiving new rules of fuzzy logic as time goes by and as the system analyzes more user data.

Figure 6:
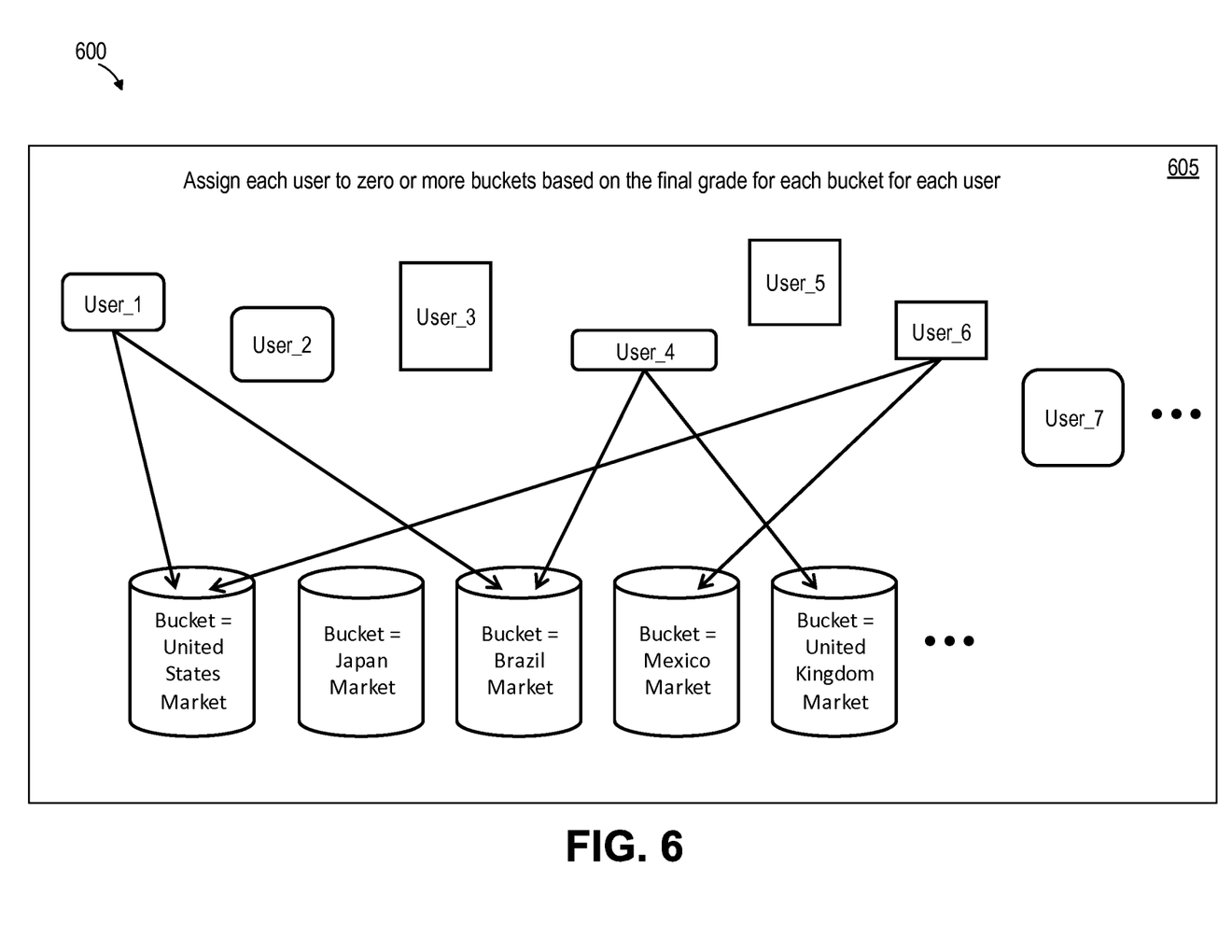
FIG. 6 is a schematic diagram of a system for assigning users to buckets, in accordance with some embodiments.

FIG. 6 is a schematic diagram of a system 600 for assigning users to buckets, in accordance with some embodiments. As mentioned above, a bucket is a relatively broad ad category. In the example of FIG. 6, the buckets are country markets that include without limitation the following: the United States market, the Japan market, the Brazil market, the Mexico market and the United Kingdom market. Country markets are shown for explanatory purposes. Many other types of buckets exist as well. Other examples of buckets include without limitation the following: age markets, gender markets, income markets and political party markets. The users in consideration in FIG. 6 include without limitation the following: User_1, User_2, User_3, User_4, User_5, User_6 and User_7.

The system 600 is configured for assigning each user to zero or more buckets based on the final grade for each bucket for each user in operation 605. If a particular bucket has a sufficiently high final grade for a particular user, then the system 600 is configured for assigning that particular user to that particular bucket. In the example of FIG. 6, the system 600 assigns User_1 to the United States market and to the Brazil market. The system 600 assigns User_4 to the Brazil market and to the United Kingdom market. The system 600 assigns User_6 to the United States market and to the Mexico market. The system 600 does not assign User_2, User_3, User_5 and User_7 to any buckets. The Japan market is not assigned to any users shown here.

Accordingly, the system 600 may recommend at least one similar for User_1 and User_6 because both users are assigned to a common bucket (e.g., the United States market). The system may serve User_1 and User_6 at least one similar ad that is preferably targeted toward people who evidently have an interest in a product/service of the United States market. The system 600 may recommend at least one similar for User_1 and User_4 because both users are assigned to a common bucket (e.g., the Brazil market). That similar ad is preferably targeted toward people who evidently have an interest in a product/service of the Brazil market. User_4 may receive at least one ad that targets people who evidently have an interest in a product/service of the Brazil market. User_6 may receive at least one ad that targets people who evidently have an interest in a product/service of the Brazil market.

These operations described with reference to FIG. 3 through FIG. 6 provide a way to target users who would otherwise not be targets of certain ads. For example, User_1 may be a resident of the United States. Using traditional targeting techniques, User_1 may not normally receive ads related to authentic Brazilian food from Sao Paulo, Brazil. However, a profile analysis under the system may indicate that User_1 has an interest in authentic Brazilian food from Sao Paulo, Brazil. That revelation may become evident only after the system processes the user profile data for User_1 by using the operations described with reference to FIG. 3 through FIG. 6. Accordingly, the system may appropriately target ads related to authentic Brazilian food to User_1. Further, an advertiser of authentic Brazilian food may receive a benefit by broadly advertising to User_1, who is a resident of the United States.

The system generates a bucket map based on the assignment of users to the buckets. A bucket map is a layout of assignments between users and buckets. FIG. 6 is an illustration of a bucket map. A bucket map is preferably generated by using primarily backend processing. Backend processing includes processing that has minimal effect or no substantial effect on front end processing. Frontend processing includes processing that typically involves serving web pages, including ads, to user devices. Frontend processing directly affects uploading speeds from user devices, as well as downloading speeds from web servers. The web server 140 of FIG. 1 may perform front end processing, including serving ads that the targeting system targets to particular users. The targeting system 120 of FIG. 1 may perform backend processing for generating a bucket map.

The system may perform substantially more backend processing than a traditional ad targeting system. However, the amount of backend processing is not particularly important, as long as the backend processing does not have a substantial adverse effect on frontend processing. If a choice must be made to have more backend processing or to have more frontend processing, then it is almost always better to have more backend processing and less frontend processing. Further, the backend processing that occurs has a significant positive effect on the frontend delivery of ads to users. For example, with the system described here, ads may be targeted substantially more accurately, substantially faster, and to broader segments of users.

Overview of Method for Targeting Ads by Grouping and Mapping User Properties

Figure 7:
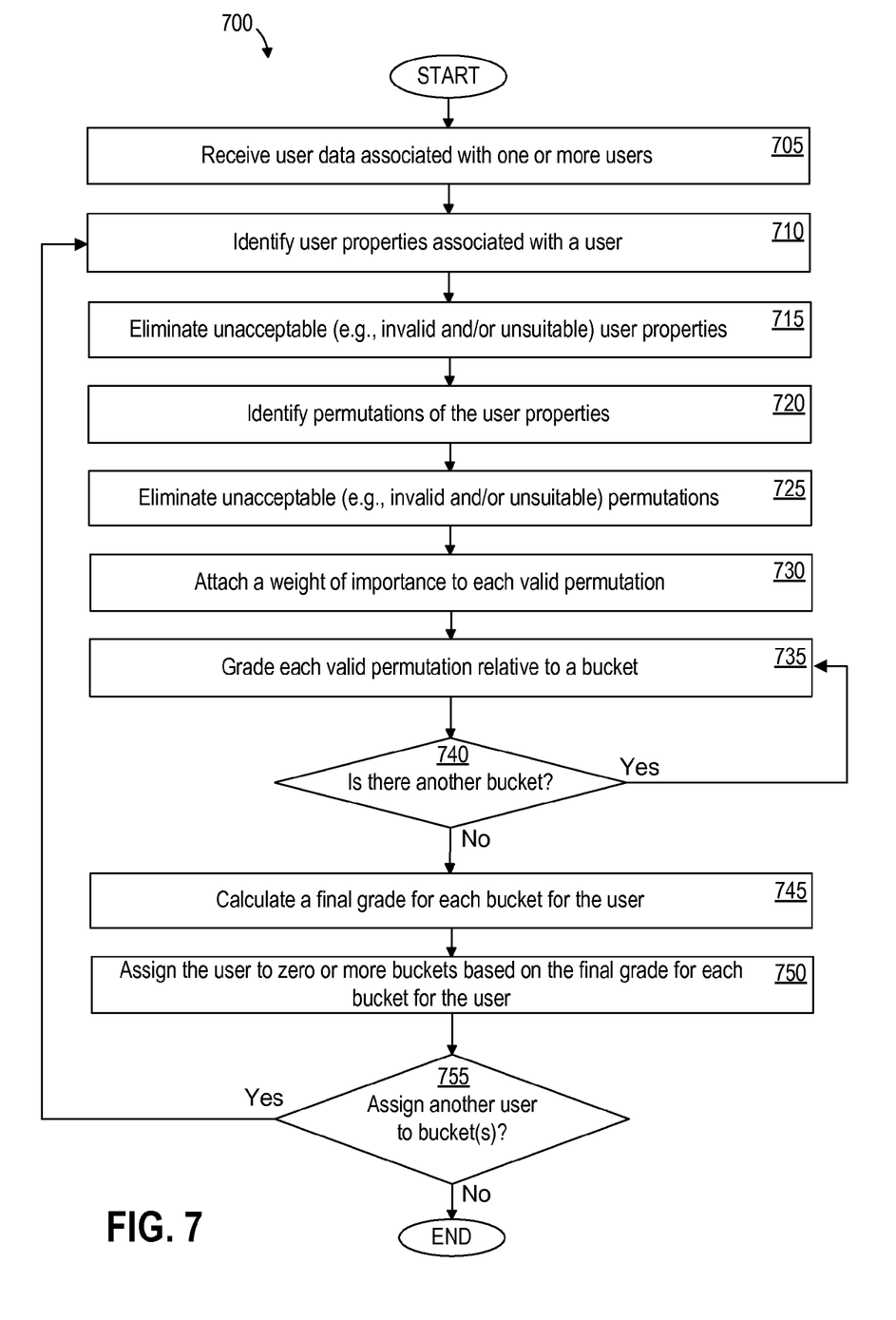
FIG. 7 is a flowchart of a method for targeting online ads by grouping and mapping user properties, in accordance with some embodiments.

FIG. 7 is a flowchart of a method 700 for targeting online ads by grouping and mapping user properties, in accordance with some embodiments. The steps of the method 700 may be carried out by one or more devices of the system 100 of FIG. 1.

The method 700 starts in a step 705 where the system receives user data associated with one or more users. The user data may include profile data that may include, for example, age, gender, location, favorite food, marital status, favorite color, etc.

The method 700 then moves to a step 710 where the system identifies user properties associated with a user. For example, identifying user properties is described above with reference to operation 305 of FIG. 3.

The method 700 proceeds to a step 715 where the system eliminates unacceptable (e.g., invalid and/or unsuitable) user properties. For example, eliminating user properties is described above with reference to operation 310 of FIG. 3.

The method 700 moves to a step 720 where the system identifies permutations of the user properties. For example, identifying permutations is described above with reference to operation 405 of FIG. 4.

The method 700 then proceeds to a step 725 where the system eliminates unacceptable (e.g., invalid and/or unsuitable) permutations. The valid permutations remain. For example, eliminating permutations is described above with reference to operation 410 of FIG. 4.

Next, in a step 730, the system attaches a weight of importance to each valid permutation. For example, attaching weights is described above with reference to operation 505 of FIG. 5.

The method 700 then moves to a step 735 where the system grades each valid permutation relative to a particular bucket. For example, grading valid permutations is described above with reference to operation 510 of FIG. 5.

Next, in a decision operation 740, the system determines if there is another bucket for which the permutations are to be graded. If the system determines that there is another bucket, then the method returns to the step 735 where the system grades each permutation for the particular bucket. The method 700 continues from there.

However, if the system determines in the decision operation 740 that there is not another bucket, then the system proceeds to a step 745 where the system calculates a final grade for each bucket for the present user. For example, calculating final grades is described above with reference to operation 515 of FIG. 5.

The method 700 then moves to a step 750 where the system assigns the user to zero or more buckets based on the final grade for each bucket for the user. For example, assigning users to buckets is described above with reference to operation 605 of FIG. 6.

Next, in a decision operation 755, the system 700 determines if another user is to be assigned to any buckets. If the system determines that another user is to be assigned to buckets, then the method 700 returns to the step 710 where the system identifies user properties associated with the user. The method 700 continues from there. However, if the system determines in the decision operation 755 that another user is not to be assigned to any buckets, then the method 700 concludes after the decision operation 755.

Note that the method 700 may include other details and steps that are not discussed in this method overview. For example, the method 700 may further include serving ads to a particular user that the system identifies as appropriate for the particular user. The method 700 may also include setting base reserve prices for ads and/or receiving ad bids from advertisers. Other details and steps are discussed with reference to the appropriate figures and may be a part of the method 700, depending on the embodiment.

Exemplary Network, Client, Server and Computer Environments

Figure 8:
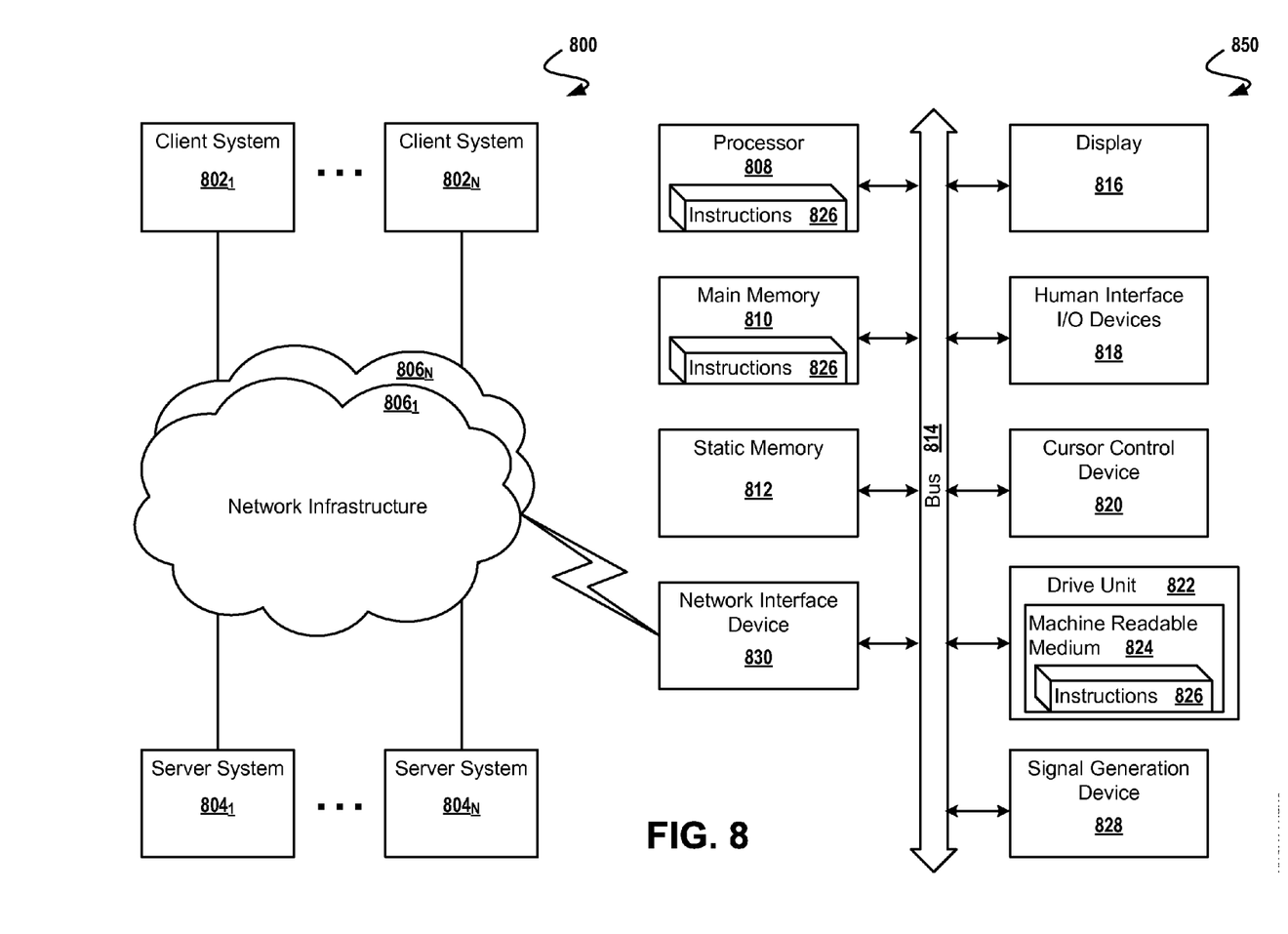
FIG. 8 is a diagrammatic representation of a network, including nodes that may comprise a machine within which a set of instructions may be executed, in accordance with some embodiments.

FIG. 8 is a diagrammatic representation of a network 800, including nodes for client systems $802_1$ through $802_N$, nodes for server systems $804_1$ through $804_N$, nodes for network infrastructure $806_1$ through $806_N$, any of which nodes may comprise a machine 850 within which a set of instructions, for causing the machine to perform any one of the techniques discussed above, may be executed. The embodiment shown is exemplary, and may be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems, a massively parallel computer system, and/or a cloud computer system.

The computer system 850 includes a processor 808 (e.g., a processor core, a microprocessor, a computing device, etc.), a main memory 810 and a static memory 812, which communicate with each other via a bus 814. The machine 850 may further include a display unit 816 that may comprise a touch-screen, or a liquid crystal display (LCD), or a light emitting diode (LED) display, or a cathode ray tube (CRT). As shown, the computer system 850 also includes a human input/output (I/O) device 818 (e.g. a keyboard, an alphanumeric keypad, etc), a pointing device 820 (e.g., a mouse, a touch screen, etc), a drive unit 822 (e.g., a disk drive unit, a CD/DVD drive, a tangible computer readable removable media drive, an SSD storage device, etc.), a signal generation device 828 (e.g., a speaker, an audio output, etc.), and a network interface device 830 (e.g., an Ethernet interface, a wired network interface, a wireless network interface, a propagated signal interface, etc.).

The drive unit 822 includes a machine-readable medium 824 on which is stored a set of instructions 826 (e.g., software, firmware, middleware, etc.) embodying any one, or all, of the methodologies described above. The set of instructions 826 is also shown to reside, completely or at least partially, within the main memory 810 and/or within the processor 808. The set of instructions 826 may further be transmitted or received via the network interface device 830 over the network bus 814.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; electrical, optical or acoustical or any other type of media suitable for storing information.

Advantages

The system is configured for better targeting of online ads by grouping and mapping existing user properties. The mapping/grouping substantially eases frontend processing tasks. The system may perform substantially more backend processing than a traditional ad targeting system. However, the amount of backend processing is not particularly important, as long as the backend processing does not have a substantial adverse effect on frontend processing. Further, the backend processing that occurs has a significant positive effect on the frontend delivery of ads to users. For example, with the system described above, ads may be targeted with a statistically higher chance of being relevant, substantially faster, and to broader segments of users. The ease on frontend processing allows user devices having lesser processing power (e.g., mobile phones) to receive well placed ads without the user devices experiencing degraded performance. Because the system performs substantially most processing in the backend and not in the frontend, targeted ads for all user devices may be processed substantially faster in the frontend and may reach a substantially broader user base. The grouping and mapping techniques performed by the system may help a company like Yahoo!™ to generate, for an advertiser (e.g., Ford), ad slots that likely would not have existed before the implementation of these techniques. A company like Yahoo!™ may significantly increase revenues through the better, more efficient ad targeting provided by the system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for targeting advertisements the method comprising:
receiving user data associated with one or more users;
identifying user properties of a first user based on the user data;
identifying a plurality of buckets, a first bucket corresponding to an advertisement category;
eliminating, by a computer, unacceptable user properties from the user properties associated with the first user for the first bucket, the unacceptable user properties comprising user properties associated with the first user that are irrelevant to the advertisement category of the first bucket;
identifying subsets of the user properties comprising two or more of the user properties associated with the first user from remaining user properties, wherein a subset is a group of user properties;
eliminating unacceptable subsets of the user properties associated with the first user, the unacceptable subsets comprising subsets that are irrelevant to the advertisement category of the first bucket, wherein valid subsets remain;
grading, by the computer, the valid subsets of the first user relative to the first bucket;
assigning the first user to the first bucket if the grading of the valid subsets of the first user is above a threshold grade; and
displaying an advertisement, targeted to the first bucket, to the first user based on the assigning of the first user to the first bucket.

2. The computer-implemented method of claim 1, further comprising at least one of:
identifying user properties for a second user, wherein the user properties for the second user are obtained from profile data about the second user, and wherein the profile data about the second user is obtained from the user data;
eliminating unacceptable user properties associated with the second user;
identifying subsets of the user properties associated with the second user;
eliminating unacceptable subsets of the user properties associated with the second user, wherein valid subsets remain; and
attaching a weight of importance to each valid subset, wherein a weight quantifies a level of importance of a valid subset for the second user with respect to buckets being analyzed.

3. The computer-implemented method of claim 1, further comprising assigning, at a computer, a second user to zero or more buckets based on the final grade for each bucket for the second user, wherein the first user and the second user are assigned to at least one common bucket.

4. The computer-implemented method of claim 1, further comprising recommending, at a computer, one or more items to serve to a user device for the first user, wherein the one or more items are associated with at least one bucket to which the first user is assigned.

5. The computer-implemented method of claim 1, wherein an unacceptable property further includes at least one of:
an invalid property; and
an unsuitable property.

6. The computer-implemented method of claim 1, wherein an unacceptable subset further includes at least one of:
an invalid subset; and
an unsuitable subset.

7. The computer-implemented method of claim 1, wherein identifying user properties for the first user comprises at least one of:
receiving item categories from an item server system; and
associating profile data with appropriate item categories in order to obtain the user properties.

8. The computer-implemented method of claim 1, wherein grading each valid subset relative to a bucket comprises attaching a grade to each valid subset, wherein each grade quantifies a level of relevance of a subset with respect to a particular bucket.

9. The computer-implemented method of claim 1, further comprising at least one of:
generating a bucket map that is a layout of assignments between users and buckets;
generating a bucket map by using primarily backend processing, wherein backend processing includes processing that has no substantial effect on front end processing, and wherein frontend processing includes processing that involves serving web pages to user devices.

10. A system, comprising at least one processor and memory, for targeting advertisements, the system comprising:
a module to receive user data associated with one or more users;
a module to identify user properties of a first user based on the user data;
a module to identify a plurality of buckets, a first bucket corresponding to an advertisement category;
a module to eliminate unacceptable user properties from the user properties associated with the first user for the first bucket, the unacceptable user properties comprising user properties associated with the first user that are irrelevant to the advertisement category of the first bucket;
a module to identify subsets of the user properties associated with the first user from remaining user properties, wherein a subset is a group of user properties;
a module to eliminate unacceptable subsets of the user properties associated with the first user, the unacceptable subsets comprising subsets that are irrelevant to the advertisement category of the first bucket, wherein valid subsets remain;
a module to grade the valid subsets of the first user relative to the first bucket;
a module to assign the first user to the first bucket if the grading of the valid permutations of the first user is above a threshold grade; and
a module to display an advertisement, targeted to the first bucket, to the first user based on the assigning of the first user to the first bucket.

11. The system of claim 10, wherein the system further comprises at least one of:
a module to identify user properties for a second user, wherein the user properties for the second user are obtained from profile data about the second user, and wherein the profile data about the second user is obtained from the user data;
a module to eliminate unacceptable user properties associated with the second user;
a module to identify subsets of the user properties associated with the second user;
a module to eliminate unacceptable subsets of the user properties associated with the second user, wherein valid subsets remain; and a module to attach a weight of importance to each valid subset, wherein a weight quantifies a level of importance of a valid subset for the second user with respect to buckets being analyzed.

12. The system of claim 10, wherein the system further comprises a module to assign a second user to zero or more buckets based on the final grade for each bucket for the second user, wherein the first user and the second user are assigned to at least one common bucket.

13. The system of claim 10, wherein the system further a module to recommend one or more advertisements to serve to a user device for the first user, wherein the one or more advertisements are associated with at least one bucket to which the first user is assigned.

14. The system of claim 10, wherein an unacceptable property further includes at least one of:
 an invalid property; and
 an unsuitable property.

15. The system of claim 10, wherein an unacceptable permutation further includes at least one of:
 an invalid subset; and
 an unsuitable subset.

16. The system of claim 10, wherein the system further comprises at least one of:
 a module to receive advertisement categories from an advertisement server system; and
 a module to associate profile data with appropriate advertisement categories in order to obtain the user properties.

17. The system of claim 10, wherein the system further comprises a module to attach a grade to each valid subset, wherein each grade quantifies a level of relevance of a subset with respect to a particular bucket.

18. The system of claim 10, wherein the system further comprises at least one of:
 a module to generate a bucket map that is a layout of assignments between users and buckets;
 a module to generate a bucket map by using primarily backend processing, wherein backend processing includes processing that has no substantial effect on front end processing, and wherein frontend processing includes processing that involves serving web pages to user devices.

19. A non-transitory computer readable medium comprising one or more instructions for targeting advertisements, wherein the one or more instructions are configured for causing one or more processors to perform the steps of:
 receiving user data associated with one or more users;
 identifying user properties of a first user based on the user data;
 identifying a plurality of buckets, a first bucket corresponding to an advertisement category;
 eliminating unacceptable user properties from the user properties associated with the first user for the first bucket, the unacceptable user properties comprising user properties associated with the first user that are irrelevant to the advertisement category of the first bucket;
 identifying subsets of the user properties comprising two or more of the user properties associated with the first user from remaining user properties, wherein a subset is a group of user properties;
 eliminate eliminating unacceptable permutations of the user properties associated with the first user, the unacceptable permutations comprising permutations that are irrelevant to the advertisement category of the first bucket, wherein valid permutations remain;
 grading, by the computer, the valid subsets of the first user relative to the first bucket;
 assigning the first user to the first bucket if the grading of the valid subsets of the first user is above a threshold grade; and
 displaying an advertisement, targeted to the first bucket, to the first user based on the assigning of the first user to the first bucket.

\* \* \* \* \*